US009778654B2

(12) United States Patent
Ochiai et al.

(10) Patent No.: US 9,778,654 B2
(45) Date of Patent: Oct. 3, 2017

(54) SYSTEMS AND METHODS FOR ADVANCED RESTING TIME SUGGESTION

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 60 days.

(21) Appl. No.: 15/052,802

(22) Filed: Feb. 24, 2016

(65) Prior Publication Data

US 2017/0242433 A1  Aug. 24, 2017

(51) Int. Cl.
  *G01C 22/00* (2006.01)
  *G05D 1/00* (2006.01)
  *G01C 21/34* (2006.01)

(52) U.S. Cl.
  CPC ....... *G05D 1/0055* (2013.01); *G01C 21/3484* (2013.01)

(58) Field of Classification Search
  CPC ................... G05D 1/0055; G01C 21/3484
  USPC .................. 701/24; 340/425.5, 540
  See application file for complete search history.

(56) References Cited

U.S. PATENT DOCUMENTS

| 5,867,587 | A | * | 2/1999 | Aboutalib | ............ | G08B 21/06 340/576 |
|---|---|---|---|---|---|---|
| 6,014,595 | A | | 1/2000 | Kobayashi | | |
| 6,061,610 | A | | 5/2000 | Boer | | |
| 6,346,887 | B1 | | 2/2002 | Van Orden et al. | | |
| 6,647,328 | B2 | | 11/2003 | Walker | | |
| 6,906,639 | B2 | | 6/2005 | Lemelson et al. | | |
| 6,927,694 | B1 | | 8/2005 | Smith et al. | | |
| 7,071,831 | B2 | | 7/2006 | Johns | | |
| 7,091,838 | B2 | | 8/2006 | Shimakage | | |
| 7,283,056 | B2 | | 10/2007 | Bukman et al. | | |

(Continued)

OTHER PUBLICATIONS

Chang, Tang-Hsien et al. "Irregular Vehicle Behavior Warning Modules"; IEEE Intelligent Vehicles Symposium; pp. 1150-1155; Jun. 13, 2007.

(Continued)

*Primary Examiner* — Thomas G Black
*Assistant Examiner* — Luke Huynh
(74) *Attorney, Agent, or Firm* — Snell & Wilmer LLP

(57) ABSTRACT

A system includes a first sensor for detecting vehicle data and a second sensor for detecting driver data. The system also includes a memory for storing preferred stops and a GPS unit for detecting a location. The system also includes an electrical control unit (ECU) that can determine a tired value of the driver based on the vehicle performance data and the driver condition data. The ECU can also determine that the driver is getting tired when the tired value is equal to or greater than a first tired threshold. The ECU can also determine a desired destination of the driver based on the preferred stops that the vehicle can reach before the tired value reaches or exceeds a second tired threshold. The system also includes an output device for outputting navigation instructions providing directions to the desired destination from the current location of the vehicle.

20 Claims, 9 Drawing Sheets

(56) References Cited

U.S. PATENT DOCUMENTS

| | | | |
|---|---|---|---|
| 7,301,464 B2 | 11/2007 | Coulter | |
| 7,389,178 B2* | 6/2008 | Raz | G09B 19/167 340/903 |
| 7,394,392 B1 | 7/2008 | Roe | |
| 7,427,924 B2 | 9/2008 | Ferrone et al. | |
| 7,444,311 B2 | 10/2008 | Engstrom et al. | |
| 7,460,940 B2 | 12/2008 | Larsson et al. | |
| 7,479,892 B2 | 1/2009 | Ling et al. | |
| 7,639,148 B2 | 12/2009 | Victor | |
| 7,663,495 B2 | 2/2010 | Haque et al. | |
| 7,689,008 B2 | 3/2010 | Hammoud et al. | |
| 7,705,738 B2 | 4/2010 | Fukaya et al. | |
| 8,190,329 B2 | 5/2012 | Kawakami et al. | |
| 2003/0229447 A1 | 12/2003 | Wheatley et al. | |
| 2004/0036601 A1* | 2/2004 | Obradovich | H04L 61/2553 340/540 |
| 2005/0182551 A1 | 8/2005 | Sugano | |
| 2006/0025897 A1 | 2/2006 | Shostak | |
| 2006/0126901 A1 | 6/2006 | Mattes et al. | |
| 2006/0217860 A1 | 9/2006 | Ihara | |
| 2006/0217861 A1 | 9/2006 | Ihara | |
| 2007/0069874 A1 | 3/2007 | Huang | |
| 2007/0124027 A1 | 5/2007 | Betzitza et al. | |
| 2007/0164852 A1 | 7/2007 | Litkouhi | |
| 2007/0236662 A1 | 10/2007 | Waldorf et al. | |
| 2008/0042813 A1 | 2/2008 | Wheatley et al. | |
| 2008/0117384 A1 | 5/2008 | Inakagata | |
| 2008/0252466 A1 | 10/2008 | Yopp | |
| 2009/0041309 A1 | 2/2009 | Kim | |
| 2009/0063201 A1 | 3/2009 | Nowotarski et al. | |
| 2009/0091435 A1 | 4/2009 | Bolourchi | |
| 2009/0219161 A1* | 9/2009 | Kocher | B60K 28/06 340/576 |
| 2009/0261979 A1 | 10/2009 | Breed et al. | |
| 2009/0299630 A1 | 12/2009 | Denaro | |
| 2009/0300067 A1 | 12/2009 | Denaro | |
| 2010/0002075 A1 | 1/2010 | Jung et al. | |
| 2010/0077421 A1 | 3/2010 | Cohen et al. | |
| 2010/0080416 A1 | 4/2010 | Lee et al. | |
| 2010/0102972 A1 | 4/2010 | Middlekauff et al. | |
| 2010/0108425 A1 | 5/2010 | Crespo et al. | |
| 2010/0109881 A1 | 5/2010 | Eskandarian et al. | |
| 2010/0152976 A1 | 6/2010 | White et al. | |
| 2010/0201896 A1 | 8/2010 | Ostreko | |
| 2010/0295707 A1 | 11/2010 | Bennie et al. | |
| 2011/0022298 A1* | 1/2011 | Kronberg | G01C 21/3484 701/532 |
| 2011/0082625 A1 | 4/2011 | Miller | |
| 2011/0090075 A1 | 4/2011 | Armitage et al. | |
| 2012/0045102 A1 | 2/2012 | Lung | |
| 2012/0233841 A1 | 9/2012 | Stein | |
| 2012/0271484 A1 | 10/2012 | Feit et al. | |
| 2013/0335213 A1* | 12/2013 | Sherony | G08G 1/167 340/439 |
| 2013/0345921 A1* | 12/2013 | Al-Ali | G05D 1/0055 701/23 |

OTHER PUBLICATIONS

"An Evaluation of Emerging Driver Fatigue Detection Measures and Technologies"; Federal Motor Carrier Safety Administration; 52 pages; Jun. 2009.

"A Fast and Effective Approach to Lane Marking and Neighboring Vehicles Detections Based on Vision/GPS Sensing Together with Vehicle-to-Vehicle Communication"; IEEE; pp. 3-8; 2009.

Hupe, Jean-Michel; Lamirel, Cedric; Lorenceu, Jean; "Pupil dynamics during bistable motion perception;" Jul. 15, 2009; Journal of Vision; pp. 1-19.

S.A. Ferguson et al., "Driver Alcohol Detection System for Safety (DADSS). Background and Rationale for Technology Approaches", SAE International, Jan. 1, 2010, 13 pages.

T. Shirakata et al., "Detect the Imperceptible Drowsiness", SAE International, Passeng. Cars—Electron. Electr. Syst., vol. 3, Issue 1, Apr. 12, 2010, pp. 98-108.

* cited by examiner

400

| PREVIOUS DESTINATIONS |
|---|
| STARBUCKS #1 |
| SUPER 8 #5 |
| SUPER 8 #6 |
| COFFEE BEAN #2 |
| MCDONALDS #8 |
| MOBIL #2 |
| BP #3 |
| MOTEL 6 #4 |
| BP #3 |
| STARBUCKS #1 |
| BURGER KING #3 |
| STARBUCKS #1 |
| MOBIL #2 |
| STARBUCKS #3 |
| COFFEE BEAN #2 |
| MCDONALDS #8 |
| STARBUCKS #1 |
| MCDONALDS #1 |
| MCDONALDS #8 |
| STARBUCKS #1 |

FIG. 4A

402 PREFERRED STOPS

| 408 CATEGORY | FREQUENCY | 406 CHAIN | FREQUENCY | 404 DESTINATION | FREQUENCY |
|---|---|---|---|---|---|
| COFFEE | 8 | STARBUCKS | 6 | STARBUCKS#1 | 4 |
|  |  |  |  | STARBUCKS#3 | 2 |
|  |  | COFFEE BEAN | 2 | COFFEE BEAN #2 | 2 |
| FAST FOOD | 5 | MCDONALDS | 4 | MCDONALDS #8 | 3 |
|  |  |  |  | MCDONALDS #1 | 1 |
|  |  | BURGER KING | 1 | BURGER KING #3 | 1 |
| GAS | 4 | BP | 2 | BP #3 | 2 |
|  |  | MOBIL | 2 | MOBIL #2 | 2 |
| MOTEL | 3 | SUPER 8 | 2 | SUPER 8 #5 | 1 |
|  |  |  |  | SUPER 8 #6 | 1 |
|  |  | MOTEL 6 | 1 | MOTEL 6 #4 | 1 |

FIG. 4B

| | | 504 | 506 TIME 1 | | 508 TIME 1 + 10 MIN | |
|---|---|---|---|---|---|---|
| | 502 | WEIGHT | VALUE | WEIGHTED VALUE | VALUE | WEIGHTED VALUE |
| VEHICLE PERFORMANCE DATA | ACCELERATION | 2 | 1 | 2 | 2 | 4 |
| | VEHICLE SPEED | 2 | 2 | 4 | 2 | 4 |
| | BRAKING DATA | 3 | 2 | 6 | 3 | 9 |
| | STEERING DATA | 3 | 1 | 3 | 2 | 6 |
| DRIVER CONDITION DATA | LANE DEPARTURE DATA | 4 | 1 | 4 | 2 | 8 |
| | FACIAL EXPRESSIONS | 4 | 2 | 8 | 3 | 12 |
| | BODY POSITION | 2 | 2 | 4 | 2 | 4 |
| | EYE MOVEMENT | 5 | 2 | 10 | 3 | 15 |
| | SPEECH PATTERN | 2 | 1 | 2 | 2 | 4 |
| TIRED VALUE | | | | 43 | | 66 |

SYSTEMS AND METHODS FOR ADVANCED RESTING TIME SUGGESTION

BACKGROUND

Field

The present disclosure relates to systems and methods for providing suggested destinations for tired drivers and, more particularly, for determining whether a driver is likely to be tired in the future and directing the driver to a destination before the driver reaches a tired threshold.

Description of the Related Art

Drivers often become tired while driving, especially during long trips. This may happen for numerous reasons such as mental stress caused by traffic, driving at night, driving in gloomy weather, boredom, lack of sleep or the like. It is well known that driving while tired affects response times, resulting in potentially unsafe driving conditions. Thus, it is desirable for tired drivers to take a break from driving and rest when they are tired.

However, drivers may not be aware of how tired they have become and/or may not be aware that their driving is affected by their lack of rest. Drivers may also trick themselves into thinking that they are less tired than they really are so that they can drive for longer periods of time without resting.

Drivers of autonomous vehicles can relinquish control of the vehicle to a control system for autonomously driving the vehicle. Where allowed by law, a driver can thus relinquish control of the vehicle when he is tired and he believes that his tiredness is affecting his driving ability. However, even if a driver is driving an autonomous vehicle and such relinquishment of control is legal, a driver may still retain control of the vehicle for far longer than is safe.

Thus, there is a need for systems and methods for determining whether a driver is likely to be too tired to safely drive and to automatically provide navigation instructions to a desired destination before the driver becomes too tired.

SUMMARY

Described herein are systems and methods for determining whether a driver is getting tired, for finding a desired destination that the driver can reach before becoming too tired and for providing navigation instructions to the desired destination. An exemplary system may include a first sensor for detecting vehicle performance data and a second sensor for detecting driver condition data. The vehicle performance data corresponds to the handling of the vehicle and the driver condition data corresponds to a status of the driver. The system also includes a memory for storing a list of preferred stops of a driver and a GPS unit for detecting a current location of the vehicle. The system also includes an electrical control unit (ECU) that is coupled to the first sensor, the second sensor, the memory and the GPS unit. The ECU can determine a tired value of the driver corresponding to how tired the driver is. The tired value of the driver is based on the vehicle performance data and the driver condition data. The ECU can also determine that the driver is getting tired when the tired value is equal to or greater than a first tired threshold. The ECU can also determine a desired destination of the driver based on the list of preferred stops. The desired destination is preferably a destination that the vehicle can reach before the tired value reaches or exceeds a second tired threshold. The system also includes an output device for outputting navigation instructions providing directions to the desired destination from the current location of the vehicle.

Also described is a method for directing a tired driver of a vehicle to an intermediate destination. The method includes detecting, by a first sensor, vehicle performance data and detecting, by a second sensor, driver condition data. The method also includes determining, by an electrical control unit (ECU), a tired value of a driver corresponding to how tired the driver is based on the vehicle performance data and the driver condition data. The method also includes determining, by the ECU, that the driver is getting tired when the tired value is equal to or greater than a first tired threshold. The method also includes storing, in a memory, a list of preferred stops of the driver. The method also includes detecting, by a GPS unit, a current location of the vehicle. The method also includes determining, by the ECU, a desired destination based on the list of preferred stops that the vehicle can reach before the tired value reaches or exceeds a second tired threshold. The method also includes outputting, by an output device, navigation instructions providing directions to the desired destination from the current location of the vehicle.

Also described is a method for directing a tired driver of a vehicle to an intermediate destination. The method includes detecting, by a first sensor, vehicle performance data. The method also includes detecting, by a second sensor, driver condition data. The method also includes determining, by an electrical control unit (ECU), a tired value of a driver corresponding to how tired the driver is based on the vehicle performance data and the driver condition data. The method also includes determining, by the ECU, a maximum amount of time that the vehicle can travel before the tired value of the driver reaches a tired threshold value. The method also includes storing, in a memory, a list of previous destinations of the vehicle. The method also includes detecting, by a GPS unit, a current location of the vehicle. The method also includes determining, by the ECU, a desired destination that the vehicle can reach within the maximum amount of time based on the list of previous destinations. The method also includes outputting, by an output device, navigation instructions providing directions to the desired destination from the current location of the vehicle.

BRIEF DESCRIPTION OF THE DRAWINGS

The features, obstacles, and advantages of the present invention will become more apparent from the detailed description set forth below when taken in conjunction with the drawings, wherein:

FIG. 4A is an exemplary list of previous destinations of the vehicle of FIG. 1 according to an embodiment of the present invention;

FIG. 4B is a table showing an exemplary list of preferred stops including categories, chains and specific destinations based on the list of previous destinations of FIG. 4A according to an embodiment of the present invention;

FIG. 5 is a table showing exemplary vehicle performance data and driver condition data, weights assigned to each data and two examples of determining a tired value of a driver based on detected vehicle performance data and driver condition data according to an embodiment of the present invention;

DETAILED DESCRIPTION

Described herein are systems and methods for determining whether a driver is becoming tired, for finding a desired destination that the driver can reach before becoming too tired and for providing navigation instructions to the desired destination. The systems and methods provide several benefits and advantages such as making drivers aware of the fact that they are becoming too tired to safely drive. This provides benefits and advantages such as increasing driver safety by reducing a number of tired drivers on the road. The systems and methods provide further benefits and advantages such as determining how far the vehicle can travel before a tired value of the driver reaches or exceeds a tired threshold and providing navigation instructions to a desired destination that the vehicle can reach before the tired value reaches or exceeds the tired threshold. Both of these benefits also provide the benefit and advantage of increasing driver safety. The desired destination is selected based on preferred categories of stops, preferred chains of stops within each category and preferred specific destinations of each chain, which provides benefits and advantages such as the desired destination being selected to align with the driver's preferences. This provides the benefit and advantage of encouraging the driver to stop at the desired destination, reducing the likelihood of the driver continuing to drive when he is too tired to safely do so.

An exemplary system includes at least one sensor, such as an accelerometer or camera, for detecting vehicle performance data corresponding to how the vehicle is being driven. The system also includes at least another sensor, such as a camera facing the driver, for detecting driver condition data corresponding to a status of a driver. The system also includes a memory for storing a list of preferred stops of the driver. The system also includes an ECU coupled to the sensors and the memory. The ECU determines a tired value of the driver corresponding to how tired the driver is. The ECU also determines how far the vehicle can travel before the tired value of the driver reaches a tired threshold. The ECU also selects a desired destination based on the list of preferred stops that the vehicle can reach before the tired value reaches the tired threshold. The system also includes an output device for providing navigation instructions to the desired destination.

Figure 1:
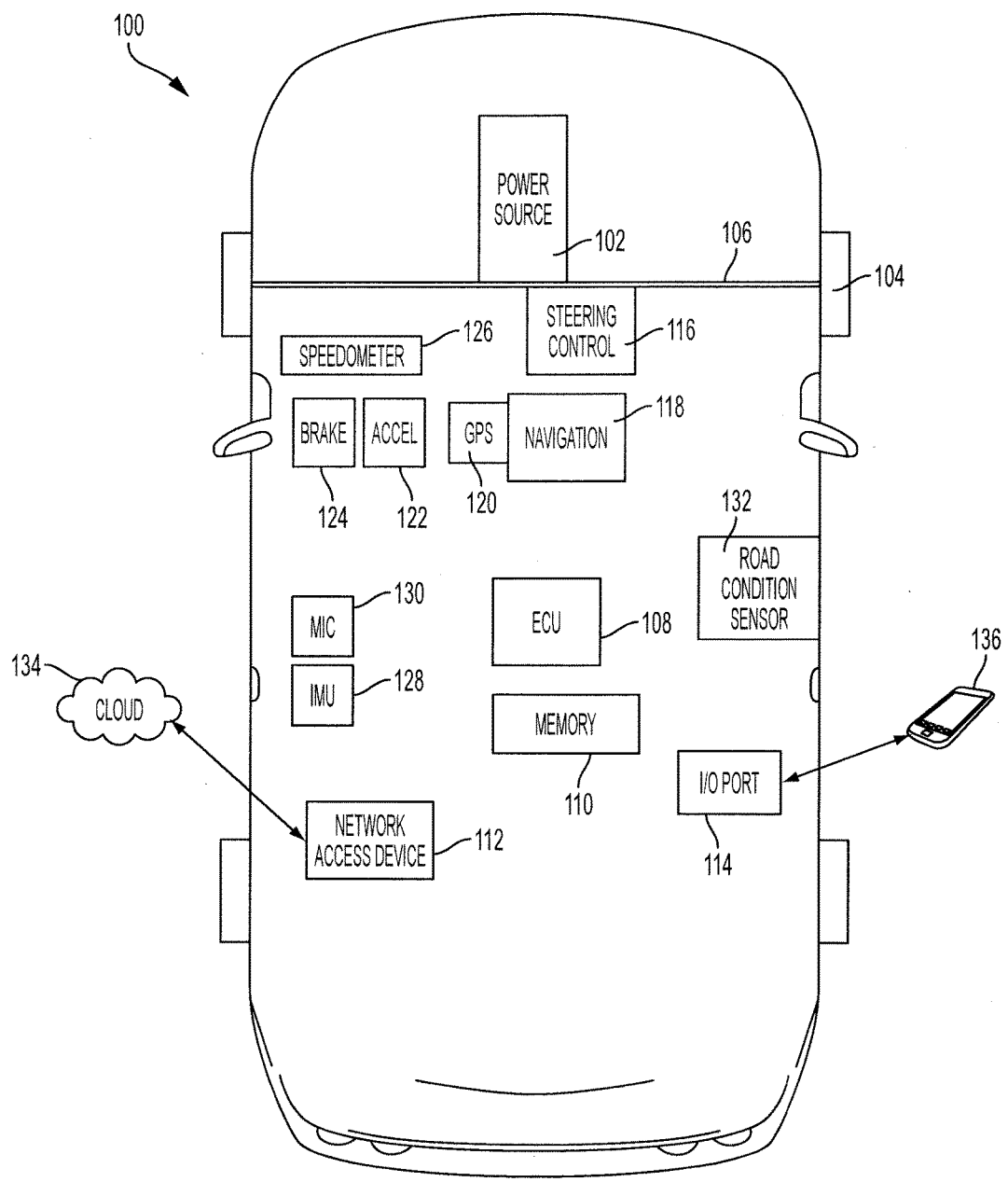
FIG. 1 is a block diagram of a vehicle having sensors for detecting vehicle performance data, driver condition data and road condition data and having an electronic control unit (ECU) for determining whether the driver is becoming tired based on the detected data according to an embodiment of the present invention.

Turning to FIG. 1, a vehicle 100 is designed to determine when a driver is getting tired, determine a desired destination that the vehicle can reach before the driver becomes too tired and to provide navigation instructions to the desired destination. The vehicle 100 includes a power source 102, wheels 104, an axle 106, an ECU 108 and a memory 110. The vehicle 100 also includes a network access device 112, an input/output port (I/O port) 114, a steering control unit 116, a navigation unit 118 and a GPS unit 120. The vehicle 100 also includes an acceleration pedal 122 and a brake pedal 124, a speed sensor 126, an inertial measurement unit (IMU) 128, a microphone 130 and a road condition sensor 132.

The power source 102 may be any power source capable of providing torque to the wheels 104 via the axle 106. For example, the power source 102 may include one or more of an engine, a motor/generator, a fuel cell or the like.

The ECU 108 can include one or more processors or controllers which may be specifically designed for automotive systems. The functions of the ECU 108 can be implemented in a single ECU or in multiple ECUs. For example, the vehicle 100 may include a first ECU that performs functions related to autonomous driving and a second ECU that performs functions corresponding to automatic resting time determinations. The ECU 108 may receive data from components of the vehicle 100, may make determinations based on the received data and may control the operation of components based on the determinations.

The memory 110 may include any non-transitory memory known in the art. In that regard, the memory 110 may store machine-readable instructions usable by the ECU 108 and may store any other data as requested by the ECU 108.

The network access device 112 may include any device capable of communicating with an external device or network. For example, the network access device 112 may communicate with the cloud 134 via 3G protocols, 4G protocols, 802.11 (Wi-Fi) protocols, a Dedicated Short-Range Communications (DSRC, usable in vehicle-to-infrastructure or vehicle-to-vehicle communications) port or the like.

The I/O port 114 can include any I/O port capable of receiving data from and/or transferring data to another device. The I/O port 114 may connect to other devices via a wired or wireless interface. For example, the I/O port 114 may be a USB port, a Wi-Fi port, a Bluetooth port or the like. The I/O port 114 may transmit data to and receive data from an external device such as a mobile device 136 (i.e., a cell phone, a tablet or the like). In that regard, the ECU 108 can communicate with the mobile device 136 via the I/O port 114.

One or both of the network access device 112 or the I/O port 114 may communicate with other vehicles or infrastructure. In that regard, one or both of the network access device 112 or the I/O port 114 may be used in vehicle-to-other device communications such as via a DSRC port. For example, the vehicle 100 may communicate with another vehicle or a network using vehicle-to-vehicle communications or vehicle-to-infrastructure communications via the network access device 112 or the I/O port 114.

The steering control unit 116 may be coupled to the axle 106 and/or to individual wheels 104. The steering control unit 116 may include an actuator or actuators for changing the position of the axle 106 and/or wheels 104 to control steering of the vehicle 100. For example, the steering control unit 116 may be a power steering system.

The ECU 108 may be coupled to the steering control unit 116 and control the steering of the vehicle via the steering control unit 116. The ECU 108 may also be coupled to the power source 102 and control power output of the power source 102. In that regard, the vehicle 100 may be autonomous meaning that the ECU 108 controls driving operations.

The GPS unit 120 may include one or more GPS receivers capable of receiving location data corresponding to a current location of the vehicle 100. In that regard, the ECU 108 can determine a current location of the vehicle 100 based on data from the GPS unit 120.

The navigation unit 118 may be coupled to the GPS unit 120 and may include an interface such as a display, one or more speakers, buttons, dials, a touchscreen, a touchpad, a remote control interface device or the like. The navigation unit 118 may receive a desired location or address via the interface and may provide navigation instructions from the current location of the vehicle to the desired location or address. In some embodiments, the functions of the navigation unit 118 may be performed by other components of the vehicle 100 such as a separate input/output device (not shown) and the ECU 108.

The acceleration pedal 122 is used by a driver to control acceleration of the vehicle 100. The acceleration pedal 122 may include or be coupled to a sensor (not shown) that detects movement of the acceleration pedal 122 corresponding to a requested amount of acceleration. The ECU 108 may be coupled to the sensor and control torque output of the power source 102 based on the movement of the acceleration pedal 122.

The brake pedal 124 is used by the driver to control braking of the vehicle 100. The brake pedal 124 may include or be coupled to a sensor (not shown) that detects movement of the brake pedal 124 corresponding to a requested braking operation. The ECU 108 may be coupled to the sensor and control braking of the vehicle based on the relative position of the brake pedal 124.

The speed sensor 126 may include a sensor and/or logic for detecting or determining the speed of the vehicle 100. For example, the speedometer may include a ground speed sensor, an accelerometer, an angular velocity sensor or the like.

The IMU 128 may include any sensor or sensors capable of detecting inertial movement of the vehicle 100. For example, the IMU 128 may include a gyroscope, an accelerometer, a magnetometer or the like. The IMU 128 may detect data corresponding to an acceleration of the vehicle 100 in one or more directions.

The microphone 130 may include any microphone or other audio sensor capable of detecting audio data. The microphone 130 may be positioned within the vehicle 100 so as to detect audio data corresponding to speech of a driver. In some embodiments, the microphone 130 may be included with the navigation unit 118 and used as an input device for the navigation unit 118 and/or ECU 108.

The road condition sensor 132 may include any sensor capable of detecting data corresponding to a road condition. The data may include, for example, weather information such as temperatures, moisture or ambient light; qualities of the road such as whether it is paved or gravel; traffic data corresponding to an amount of traffic on the road; speed limit data corresponding to a speed limit; or the like. In some embodiments, road condition data may be received from the cloud 134 or mobile device 136 instead of, or in addition to, the road condition sensor.

Figure 2:
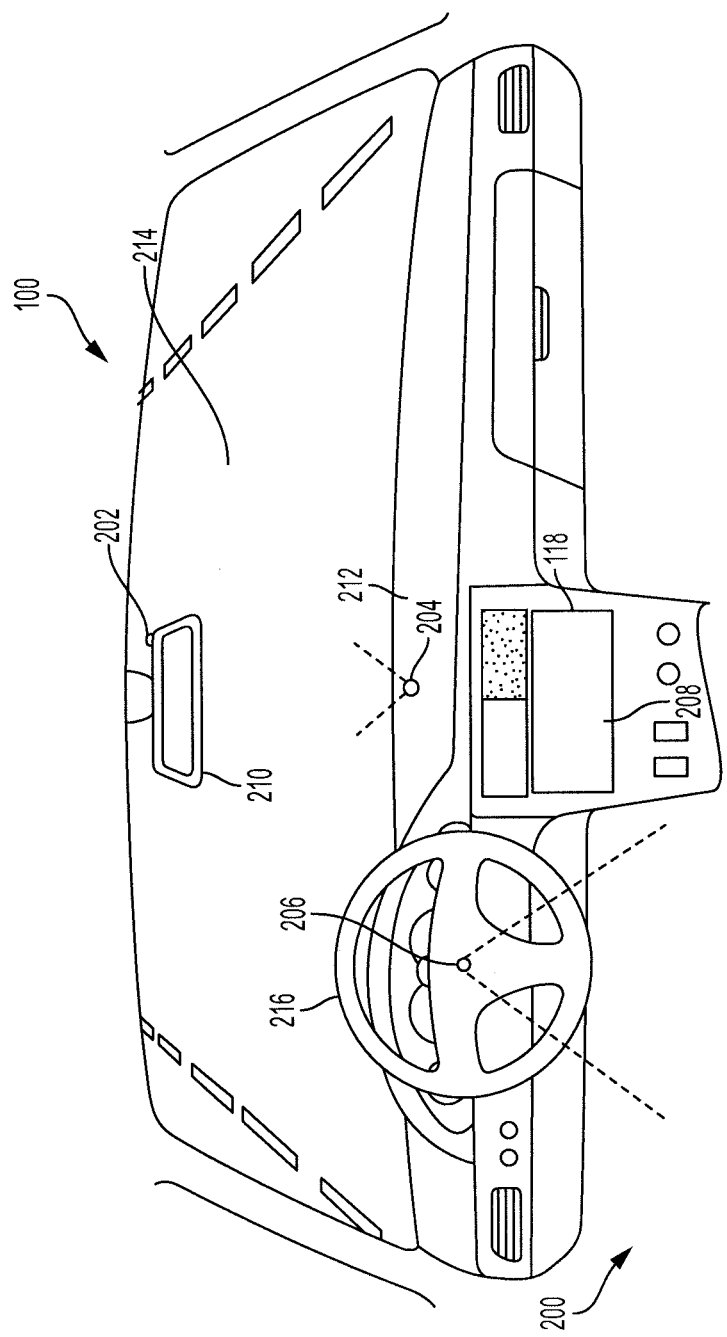
FIG. 2 is a drawing of an interior cabin of the vehicle of FIG. 1 including a driver-facing camera and a forward-facing camera according to an embodiment of the present invention.

Referring to FIGS. 1 and 2, a view of an interior 200 of the vehicle 100 shows additional components of the vehicle 100. As shown, the vehicle 100 also includes an ambient light sensor 202, a forward-facing camera 204 and a driver-facing camera 206. Furthermore, the navigation unit 118 is shown as having a touchscreen interface 208.

The ambient light sensor 202 is designed to detect ambient light of the environment of the vehicle 100. The ambient light sensor 202 may detect whether the sun is shining brightly, whether it is currently cloudy, whether it is nighttime or the like. The ambient light sensor 202 may be positioned within the interior 200 at a location that is exposed to ambient light, such as on a rear-view mirror 210 or a dashboard 212 of the vehicle 100.

The forward-facing camera 204 may include one or more camera and is designed to detect or capture image data corresponding to an environment of the vehicle 100. The forward-facing camera 204 may face forward of the vehicle and detect data corresponding to a road 214. The forward-facing camera 204 may detect data such as whether the road 214 is paved, whether there is traffic on the road 214, whether the vehicle 100 is approaching a lane marker or the like. In that regard, the forward-facing camera 204 and the ambient light sensor 202 may each be road condition sensors.

The forward-facing camera 204 may be positioned at a location in which it can detect data corresponding to the road in front of the vehicle 100. For example, the forward-facing camera 204 may be positioned on the dashboard 212 or the rear-view mirror 210 of the vehicle 100.

The driver-facing camera 206 may include one or more cameras and is designed to detect or capture image data corresponding to the driver. In some embodiments, the driver-facing camera 206 may include infrared sensors or other sensors capable of detecting image data in various levels of light such that image data may be detected regardless of current levels of light in the interior 200.

The driver-facing camera 206 is directed towards the driver's seat and positioned such that it can detect image data corresponding to at least a portion of the driver. For example, the driver-facing camera 206 may be positioned so as to detect image data corresponding to the driver's head and face. In that regard, the driver-facing camera 206 can detect facial expressions of the driver, a direction of the driver's gaze, whether the driver is staring at a particular point, whether the driver's eyes are droopy or the like.

The driver-facing camera 206 may also or instead be positioned to detect image data corresponding to the driver's body. In that regard, the driver-facing camera 206 can detect a body position of the driver, whether the driver is leaning or slumping or the like. In some embodiments, two or more driver-facing cameras may be included to detect data corresponding to different body parts of the driver.

The driver-facing camera 206 may be positioned in such a location as to be able to detect at least a portion of the driver. For example, the driver-facing camera 206 may be positioned on a steering wheel 216, the dashboard 212, the rear-view mirror 210 or the like.

The steering wheel 216 may be coupled to a sensor (not shown) for detecting a current steering position of the steering wheel 216. In that regard, the ECU 108 may receive requested steering operations from the sensor. The ECU 108 may control operation of the steering control unit 116 based on the requested steering operations.

The ECU 108 may be coupled to the components of the vehicle 100 and receive vehicle performance data, driver condition data and road condition data. The vehicle performance data includes data corresponding to the driving and handling of the vehicle 100. For example, the vehicle performance data may include speed data from the speed sensor 126, acceleration data from the IMU 128, braking data from the brake pedal 124, steering data from the steering wheel 216, lane departure data from the forward-facing camera 204 or the like.

Each of the vehicle performance data may be used in a calculation to determine how tired the driver of the vehicle 100 is. For example, a constant speed of the vehicle 100 may indicate that the driver is less tired than a variable speed. Likewise, smooth accelerations may indicate that the driver is less tired than hard or reactionary accelerations; smooth and early braking may indicate that the driver is less tired than hard and reactionary braking; smooth steering may indicate that the driver is less tired than reactionary steering; and a lack of unwarranted lane departures may indicate that the driver is less tired than multiple unwarranted lane departures.

The driver condition data includes data corresponding to the driver's condition or state within the vehicle. For example, the driver condition data may include facial expressions of the driver detected by the driver-facing camera 206, body positions of the driver detected by the driver-facing camera 206, eye movement of the driver detected by the driver-facing camera 206, speech patterns of the driver detected by the microphone 130, or the like. In some embodiments, the driver condition data may be detected by sensors that are not included with the vehicle 100. For example, the driver condition data may include biometric data from wearable devices, data detected by sensors embedded within clothing or any other data detected by a device that is part of the internet of things (IoT).

Each of the driver condition data may also or instead be used in a calculation to determine how tired the driver is. For example, an alert expression on the driver's face may indicate that the driver is less tired than a drowsy expression. Likewise, an upright body position of the driver may indicate that the driver is less tired than a slouched body position; occasional side-to-side eye movement of the driver's eyes may indicate that the driver is less tired than a continuous stare in one direction; and clear and intelligible speech may indicate that the driver is less tired than slurred speech.

The road condition data includes data corresponding to an environment of the vehicle 100 and/or a road on which the vehicle 100 is traveling. For example, the road condition data may include weather data from the road condition sensor 132, the forward-facing camera 204, the ambient light sensor 202, or the like. In some embodiments, the weather data may also or instead be received from the cloud 134, via the user's mobile device 136 or from a vehicle-to-other device system (such as vehicle-to-vehicle or vehicle-to-infrastructure). The road condition data may also include current traffic along the driver's route detected by the forward-facing camera 204. In some embodiments, the current traffic data may also or instead be received from the cloud 134, the user's mobile device 136 and/or from the vehicle-to-other device system. The road condition data may also include a speed limit of a road of the vehicle detected by the forward-facing camera 204, received from the cloud 134, the user's mobile device 136 and/or the vehicle-to-other device system. The road condition data may also include data indicating a road surface of a current road received from the forward-facing camera 204, received from the cloud 134, the user's mobile device 136 and/or the vehicle-to-other device system.

Each of the road condition data may be used in a calculation to estimate the rate at which the driver is getting tired. For example, a driver may get tired more quickly when the weather is sunny than at nighttime. Similarly, a driver may get tired more quickly in traffic due to the mental stress traffic can cause. A driver may also get tired more quickly if a speed limit is high due to the mental stress that driving at high speeds can cause. A driver may also get tired more quickly if a road surface is rocky due the mental stress that driving on rough terrain can cause.

The ECU 108 may determine a tired value of the driver that corresponds to how tired the driver is based on the vehicle performance data and the driver condition data. A higher tired value corresponds to the driver being more tired than a lower tired value. The ECU 108 may also determine a tired threshold. It may be recommended that the driver not drive when the tired value is greater than the tired threshold.

The ECU 108 may also store previous vehicle performance data, driver condition data and road condition data. The ECU 108 may determine or estimate a rate at which the tired value of the driver will increase based on an analysis of the stored data. The ECU 108 may continuously learn and improve the accuracy of the rate of increase of the tired value as more and more data is collected and analyzed.

The ECU 108 may also store a list of preferred stops of the vehicle based on previous destinations. The ECU 108 may continuously improve its list of preferred stops as more and more destination data is detected and analyzed.

The ECU 108 may monitor the tired level of the driver and recommend one or more desired destinations for the driver to stop before the tired value reaches the tired threshold. In some embodiments, the ECU 108 may select a desired destination for the driver. After the desired destination has been selected, the ECU 108 may provide navigation instructions to the driver.

Although selecting desired destinations and determining navigation instructions are described as being performed by the ECU 108, they may also or instead be selected and/or determined by the navigation unit 118. In that regard, a processor of the navigation unit 118 may also be referred to as an ECU.

Figure 3:
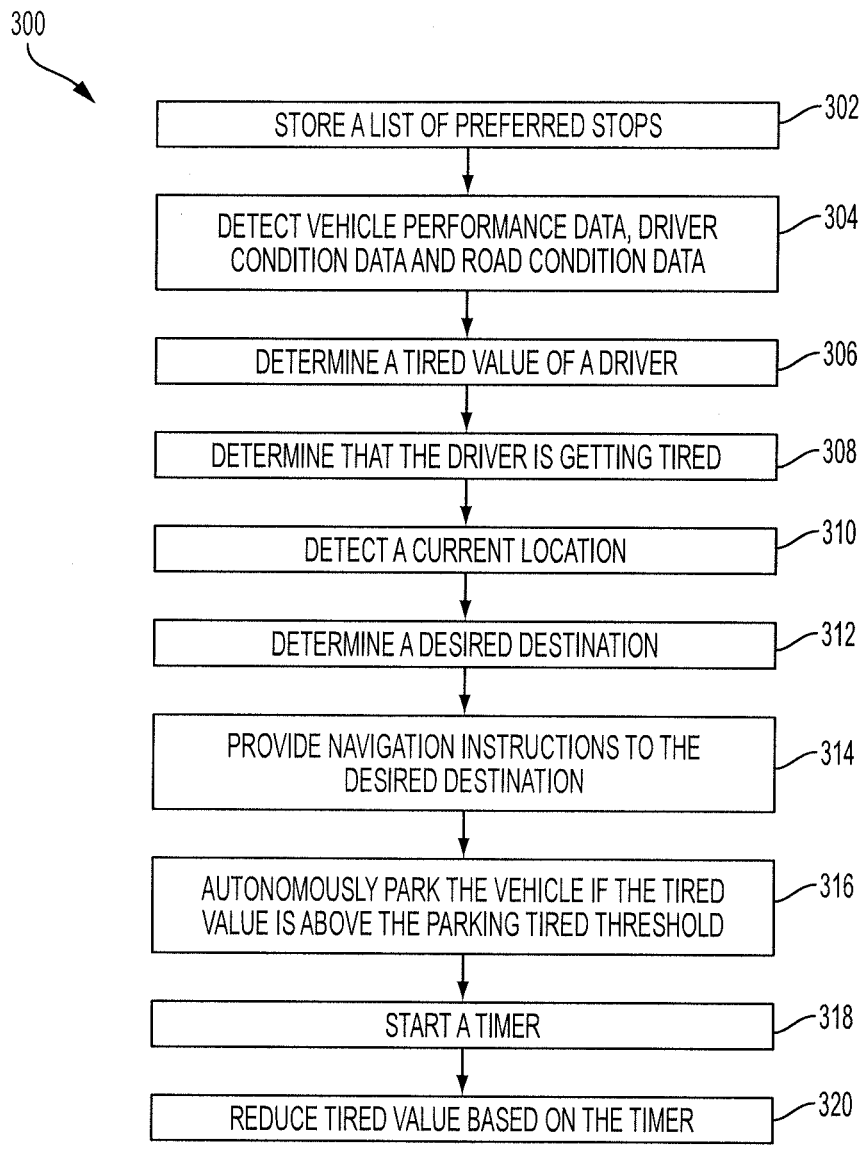
FIG. 3 is a flowchart illustrating a method for determining whether a driver of a vehicle is becoming tired and providing navigation instructions to a desired destination that the vehicle can reach before the driver becomes too tired to safely drive according to an embodiment of the present invention.

Turning now to FIG. 3, a method 300 for directing a driver to a destination before the driver reaches a tired threshold is shown. The method 300 may be performed by a vehicle similar to the vehicle 100 of FIG. 1 and utilizing similar components.

In block 302, a list of preferred stops of the driver is created and/or stored. The list may be created by an ECU and stored in a memory. As described above, the preferred stops can be determined based on previous destinations input into a navigation unit. The preferred stops can also or instead be determined based on locations at which the vehicle has previously stopped. For example, each time the vehicle is turned off, the ECU may determine a current location of the vehicle using a GPS unit and determine destinations that are present at the current location. For example, if the vehicle stops at an address associated with a McDonalds, the ECU may determine that the current destination is the McDonalds because the current location matches the address of the McDonalds. In some embodiments, if the ECU cannot determine specific information corresponding to the current destination, the ECU may store a nearby destination as a preferred stop.

Turning now to FIGS. 4A and 4B, a list of previous destinations 400 of the vehicle is shown. The list of previous destinations 400 includes specific destinations such as a Starbucks location number one (#1). Starbucks refers to the chain and the #1 refers to the specific Starbucks location. For example, Starbucks #1 is at a different location than Starbucks #3.

By analyzing the list of previous destinations 400, the ECU can determine a list of preferred stops. The ECU may separate each of the destinations into a chain and/or into a category of destinations, as shown in the list of preferred stops 402. For example, the ECU may determine that Starbucks #1 and Starbucks #3 are both in the Starbucks chain and in the coffee shop category. The ECU may determine that Coffee Bean #2 is in the Coffee Bean chain and coffee shop category.

The ECU may determine the frequency that the vehicle stopped at each specific destination 404, at each chain 406 and at each category 408. This data may be collected and stored in a memory for later use. Higher frequency values correspond to higher priority. Thus, with regards to destinations, Starbucks #1 has the highest priority with a frequency of 4 and McDonalds #8 has the second highest priority with a frequency of 3. With regards to chains, Starbucks has the highest priority with a frequency of 6 and McDonalds has the second highest priority with a frequency of 4. With regards to categories, coffee shops have the highest priority with a frequency of 8 and fast food has the second highest priority with a frequency of 5.

Returning to FIG. 3, the method 300 may proceed to block 302 where the ECU detects and/or receives vehicle performance data, driver condition data and road condition data. The vehicle performance data, driver condition data and road condition data are detected and/or received as discussed above with reference to FIGS. 1 and 2.

In block 306, the ECU determines a tired value of a driver. The tired value is based on at least one of the vehicle performance data or the driver condition data.

Referring to FIG. 5 a chart 500 showing exemplary vehicle performance data and driver condition data is shown. The vehicle performance data and driver condition data are used to determine a tired value of a driver. Column 502 shows the various types of vehicle performance data and driver condition data and column 504 shows a weight corresponding to each type of data.

The weight of each type of data indicates how much a change in each type of data corresponds to a change in how tired the driver is. For example, a change in body position has a weight of 2 and a change in eye movement has a weight of 5. This indicates that a change in eye movement data more strongly corresponds to a change in the tired value of the driver than a change in body position data.

In order to determine the tired value of the driver, values may be determined for each of the types of data. The values may then be multiplied by the corresponding weight of the type of data, resulting in a weighted value. The result of all of the multiplications may be summed to find the tired value.

Column 506 shows an example of determining the tired value of the driver using detected vehicle performance data and driver condition data. The values assigned to the detected data were detected and/or assigned at a time 1. As shown, a value has been assigned to each type of data. The value corresponds to how much the particular data indicates that the driver is tired. The value may range from 0 to 5 with a 0 corresponding to no indication of tiredness and 5 corresponding to a high indication of tiredness.

Each of the detected data values are multiplied by the weight shown in column 504, resulting in a weighted value. The weighted values are then summed to determine the tired value. As shown, at time 1, the tired value of the driver may be a 43.

Column 508 shows data used to determine the tired value of the driver 10 minutes after the time 1. As shown, many of the values have increased, resulting in the tired value being 66.

Returning to FIG. 3 and in some embodiments, the ECU may not begin to determine tired values of a driver until a predetermined amount of time has elapsed since the trip began. For example, the ECU may begin to determine the tired values of the driver after one hour, or one and a half hours, or two hours of driving have elapsed. This is based on an assumption that the driver will not begin to drive when he is relatively tired.

The trip should be defined such that stops shorter than a predetermined amount of time do not reset the accumulated amount of time. For example, the predetermined amount of time may be one hour. If a driver departs his house, drives for 45 minutes to a gas station and stops at the gas station for 15 minutes, the timer may continue to count from 45 minutes when the driver resumes his trip.

The ECU may also determine a rate of increase of the tired value of the driver in block 306. The ECU may determine the rate by analyzing previously-detected vehicle performance data, driver condition data and road condition data. The ECU may determine an average rate of increase of the tired value. The ECU may also determine the rate of increase of the tired value when certain conditions are met. For example, the ECU may determine that the rate of increase of the tired value increases when the eye movement data reaches a value of 3 or more. As another example, the ECU may determine that the rate of increase of the tired value increases when a speed limit is 55 and the braking data has a value of 4 or more.

In some embodiments, the ECU may not perform any actions with regards to the tired value until the tired value indicates that the driver is getting tired. Thus, in block 308, the ECU may determine that the driver is getting tired based on the tired value. For example the tired value of the driver may be compared to a first tired threshold. The method 300 may not proceeded past block 308 until the tired value of the driver reaches the first tired threshold. The first tired threshold may correspond to a value at which the ECU assumes that the driver is beginning to get tired.

A second tired threshold corresponds to a threshold above which the ECU determines the driver should not drive. In some embodiments, the first tired threshold may be set to be relatively near the second tired threshold such that unnecessary stops are not made. For example, if the first tired threshold is reached two hours before the second tired threshold is reached, the ECU may provide navigation instructions to the driver for the driver to stop at a desired destination nearly two hours before the driver is deemed too tired to drive. This stop may be undesirable to the driver and cause him to refuse later instruction to stop.

After the ECU determines that the driver is getting tired in block 308, the ECU may determine a current location of the vehicle in block 310. The ECU may determine the current location based on data from a GPS unit, data from an IMU, data from a network access device or the like.

In block 312 the ECU determines a desired destination. The desired destination may be selected based on the tired value of the driver, the rate of increase of the tired value of the driver, the list of preferred stops and the current location of the vehicle.

Figure 6:
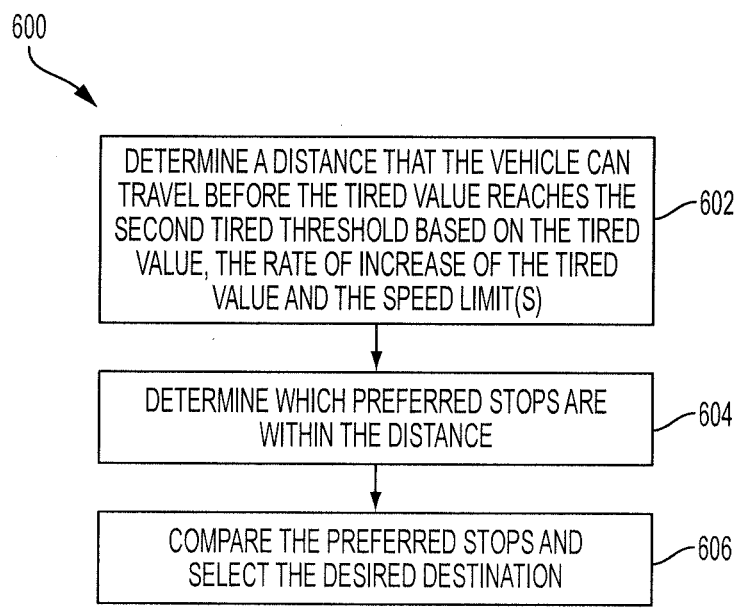
FIG. 6 is a flowchart illustrating a method for selecting a desired destination from a list of preferred stops according to an embodiment of the present invention.

Turning to FIG. 6, a method 600 for determining a desired destination is shown. In block 602, the ECU determines a distance that the vehicle can travel before the tired value of the driver reaches the second tired threshold value. This distance may be determined based on one or more of the current tired value, the rate of increase of the tired value and the speed limit(s) of the roads on which the vehicle is traveling. For example, the second tired threshold of the driver may be a tired value of 50. The current tired value of the driver may be 30 and may be increasing at a rate of 1 per 5 minutes. In that regard, the tired value of the driver may reach the second tired threshold in 100 minutes (i.e., 1.67 hours). Although the rate of increase of the tired value is described as linear, it may have any linear or non-linear pattern.

After the amount of time before the tired value reaches the second tired threshold is determined, the ECU may determine the speed limits for roads on which the vehicle is traveling. If the entire route is known, the ECU may search for the speed limits for all roads along the route. If the entire route is not known, the ECU may predict the route, using any of a number of route prediction algorithms. In some embodiments the ECU may use the current speed of the vehicle instead of speed limits.

After determining the amount of time until the tired value reaches the second tired threshold and the speed limit(s), the ECU can determine the distance that the vehicle can travel before the tired value reaches the second tired threshold by multiplying the amount of time by the speed limit(s). For example, if the vehicle is on a stretch of highway having a speed limit of 70 mph and will be on the highway for at least 150 miles, the ECU will multiply the amount of time (1.67 hours) by the speed limit (70 mph), resulting in a distance of 117 miles. If the vehicle were to be on the highway for less than 117 miles, the ECU may incorporate the speed limit of the road(s) the vehicle will be on after the highway into the distance determination.

After determining the distance in block 602, the ECU may determine which preferred stops are within the distance in block 604. The ECU may determine all of the locations of specific destinations, all locations of chains and all locations of categories within the determined distance.

In block 606 the ECU may compare the preferred stops and select the desired destination. In some embodiments the desired destination may be selected as the preferred stop having the highest priority. In some embodiments, the desired destination may also be selected based on a recent destination, a day of the week and/or a time of day. For example, a restaurant may not be selected as a desired destination within 3 hours of a previous stop at a restaurant. As another example, a motel may not be selected as a desired destination between the hours of 5 am and 4 pm. As another example, a motel may not be selected on a weekday. These settings may be changeable by the driver to suit his preferences.

Figure 7:
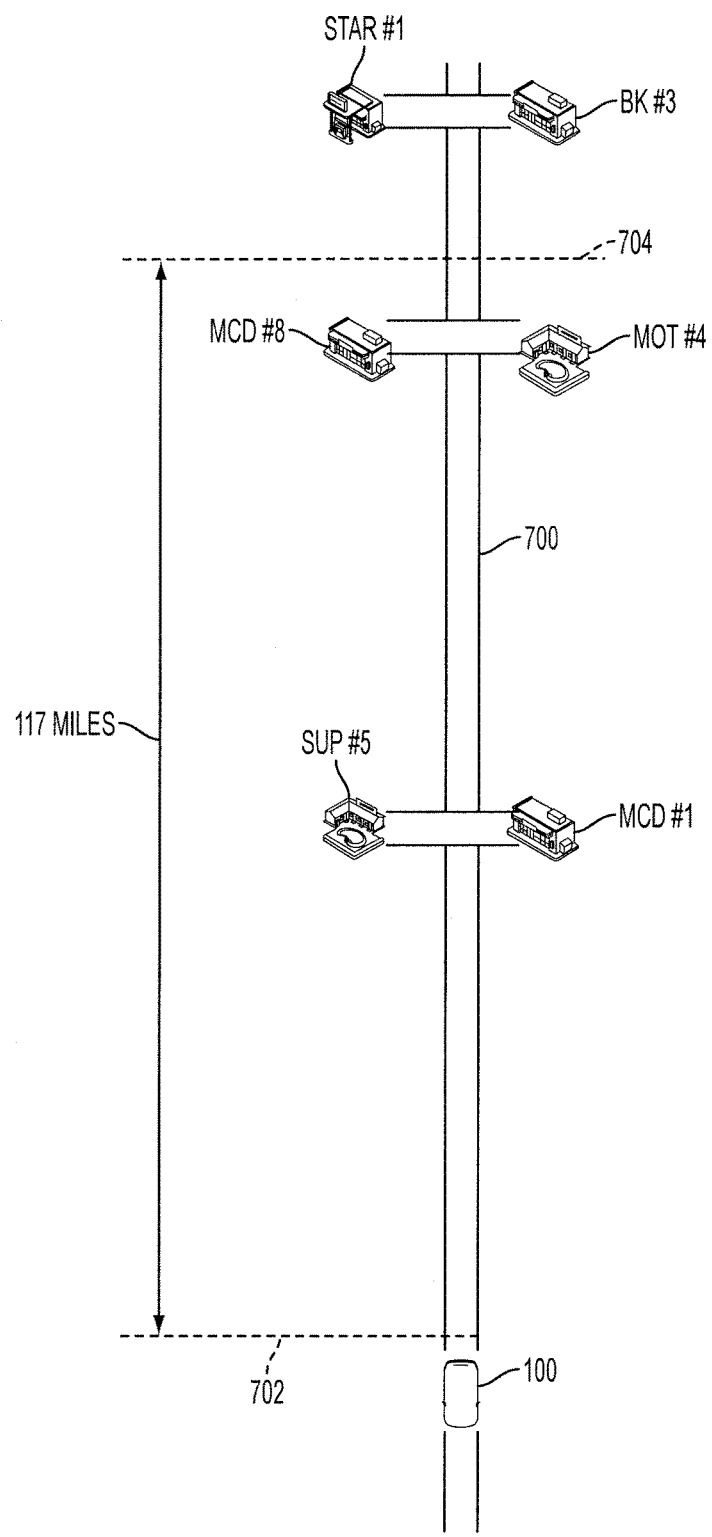
FIG. 7 is a drawing of a road showing an exemplary use of the method illustrated in FIG. 6 according to an embodiment of the present invention.

Turning to FIGS. 4B and 7, an exemplary use of the method 600 of FIG. 6 is shown. The vehicle 100 is at a first location 702 along a road 700. A second location 704 corresponds to 117 miles which is the distance that the vehicle 100 can travel before the tired value of the driver reaches the second tired threshold. Thus, the vehicle 100 can reach any destination between the first location 702 and the second location 704.

Within this section of the road 700 is the Super 8 (SUP) #5, McDonalds (MCD) #1, McDonalds #8 and Motel 6 (MOT) #4. If the current time is 2 pm, the ECU may eliminate the Super 8 and the Motel 6 due to the time of day. The ECU may then compare the McDonalds #1 and the McDonalds #8 from the list of preferred stops 402. As a result of the comparison, the ECU may determine that the McDonalds #8 has the highest priority with the frequency of 3.

Returning to FIG. 6 and in some embodiments, the ECU may select the desired destination based on the highest priority categories and chains. For example, the ECU may first determine whether the vehicle can reach any destinations associated with the highest priority category before the tired value of the driver reaches the second tired threshold. If not, the ECU may determine whether the vehicle can reach any destinations associated with the second highest priority category before the tired value of the driver reaches the second tired threshold.

After finding the highest rated category having at least one destination that the vehicle can reach, the ECU may determine whether the vehicle can reach any destinations associated with the highest priority chain before the tired value of the driver reaches the second tired threshold. If not, the ECU may determine whether the vehicle can reach any destinations associated with the second highest priority chain before the tired value of the driver reaches the second tired threshold.

After finding the highest rated chain having at least one destination that the vehicle can reach, the ECU may compare the destinations associated with the chain to the specific preferred destinations. If one or more destination is found in the list of preferred stops, the ECU may compare the list and find the highest priority destination. For example, if the highest priority category is coffee shops, the highest priority chain is Starbucks and the vehicle can reach a first Starbucks having a priority of 4 and a second Starbucks having a priority of 1, the ECU may select the first Starbucks as the desired destination. If no specific destinations are found in the list of preferred stops, the ECU may select any destination associated with the preferred chain.

If no preferred chains can be reached before the tired value of the driver reaches the second tired threshold, the ECU may select any destination associated with the highest priority category as the desired destination.

Figure 8:
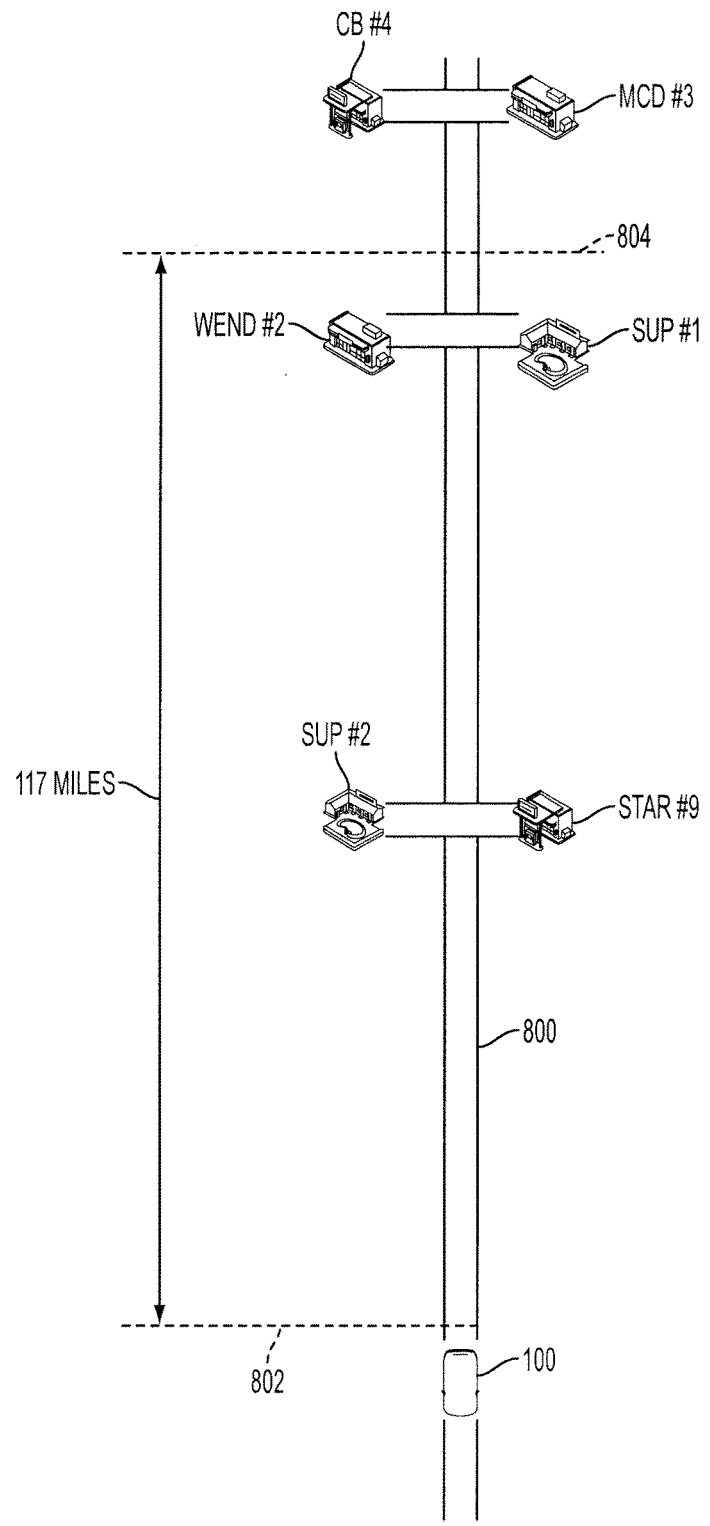
FIG. 8 is a drawing of a road showing another exemplary use of the method illustrated in FIG. 6 according to an embodiment of the present invention.

Turning to FIGS. 4B and 8, another exemplary use of the method 600 of FIG. 6 is shown. The vehicle 100 is at a first location 802 along a road 800. A second location 804 corresponds to 117 miles which is the distance that the vehicle 100 can travel before the tired value of the driver reaches the second tired threshold. Thus, the vehicle 100 can reach any destination between the first location 802 and the second location 804.

Along this section of the road 800 is a Starbucks (STAR) #9, a Super 8 (SUP) #2, a Super 8 #1 and a Wendy's (WEND) #2. The ECU may determine the desired destination for this scenario based on categories and/or chains. For example, the ECU may determine that the category having the highest priority is coffee shops. The ECU may then determine that Starbucks has the highest priority within the coffee shops category. The ECU may then select the Starbucks #9 as the desired destination because it is associated with the highest priority chain in the highest priority category.

Returning to FIG. 3, the ECU may select more than one desired destination from the list of preferred stops. For example, the ECU may select one desired destination from each category, may select the three highest rated destinations or the like. The ECU may cause an output device to output the list of desired destinations to the driver. The driver may use an input device to select the desired destination from the list, and that destination will be set as the desired destination.

In some embodiments, the ECU may first provide the driver with the categories having the highest priorities and having at least one destination within the distance the vehicle can reach before the driver becomes too tired. The user may then select one of the categories. The ECU may then output a list of chains having the highest priority within the category and the user may select the chain. The ECU may then output a list of the specific destinations associated with the chains and the driver may select a preferred specific destination to be the desired destination. This allows the user to provide more input regarding where he will stop, increasing the likelihood of the driver stopping to rest when instructed.

Once the desired destination has been selected in block 312, the ECU may determine navigation instructions to the desired destination and cause an output device to output the navigation instructions in block 314.

In some embodiments, the driver may not wish to stop at the desired destination. In that regard, the user may use the input device to indicate to the ECU that the user does not wish to stop at the desired destination. The ECU may determine the location of at least a second desired destination and output a distance to the at least second destination in response to receiving driver input indicating that the driver does not want to stop at the first desired destination. By receiving the distance, the driver will be aware of the distance to the next desired destination and can better make a decision regarding whether or not to stop at the desired destination.

For example, if the desired destination is five miles away, the driver may decide to not stop based on this information alone. However, if the next desired destination is 200 miles away and the driver is made aware of this distance, he may decide to stop at the desired destination that is 5 miles away so that he will not have to drive for 200 miles without resting.

In some embodiments, the user may miss a turn on the way to the desired destination. In that regard, the ECU may determine alternative navigation instructions to the desired destination or may determine the next desired destination that the vehicle can reach before the tired threshold of the driver reaches the second tired threshold.

Figure 9:
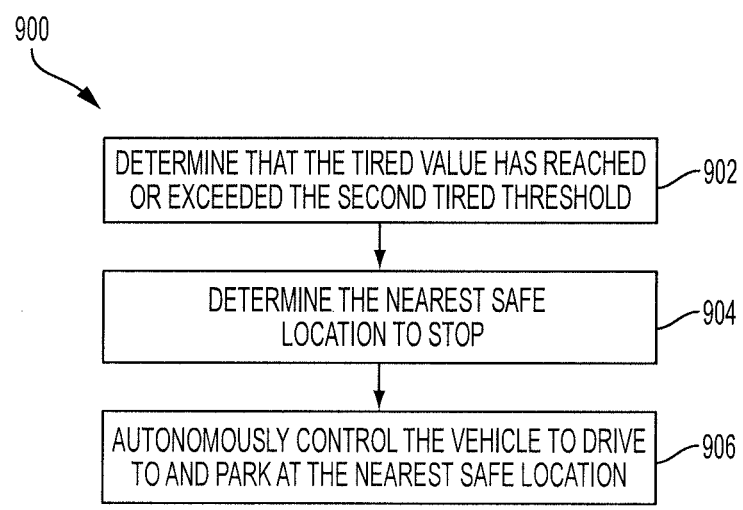
FIG. 9 is a flowchart illustrating a method for controlling a vehicle when an ECU determines that a driver is too tired to drive safely according to an embodiment of the present invention.

In some embodiments and referring to FIG. 9, the tired value of the driver may reach the second tired threshold, or a third tired threshold that is greater than the second tired threshold, before the user stops. In that regard, a method 900 may be used by the ECU to safely stop the vehicle. In block 902, the ECU may determine that the tired value has reached or exceeded the second tired threshold. In some embodiments, the ECU may wait until the tired value of the driver has reached or exceeded the third tired threshold that is greater than the second tired threshold.

In block 904, the ECU may determine the nearest safe location for the vehicle to stop. A safe location may be defined as any location having a parking lot such as a rest area, a hotel, a gas station or the like. In some embodiments, the ECU may determine if the vehicle can reach any preferred stop within a predetermined distance, such as within 5 miles of a current location. In these embodiments the ECU may use the preferred stop as the nearest safe location so that the driver can rest at a preferred stop instead of a random stop.

In block 906, the ECU may autonomously control the vehicle to drive to and park at the nearest safe location. By autonomously controlling the vehicle once the tired value of the driver has reached or exceeded a relatively high value, the likelihood of an accident caused by the tired driver is greatly reduced.

Returning to FIG. 3, a parking tired threshold may be defined as a tired value threshold above which the driver's parking abilities are diminished. The parking tired threshold may be between the first tired threshold and the second tired threshold or may be above the second tired threshold. In block 316 if the tired value of the driver is at or above the parking tired threshold when the vehicle reaches the desired destination, the ECU may autonomously control the vehicle to safely park in a parking spot. This may prevent a tired driver from damaging his vehicle or other property when parking.

After the vehicle has reached a destination, the ECU may start a timer in block 318. When the driver starts the vehicle after the stop, the ECU may reduce the tired value of the driver based on the amount of time that has expired since the vehicle reached the destination. The longer that the driver rests, the more the tired value of the driver should be reduced. The tired value may reset after a predetermined amount of time has elapsed such as 5 hours, 8 hours or the like.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for directing a tired driver of a vehicle to an intermediate destination comprising:
   a first sensor configured to detect vehicle performance data;
   a second sensor configured to detect driver condition data;
   a memory configured to store a list of preferred stops of a driver;
   a GPS unit configured to detect a current location of the vehicle;
   an electrical control unit (ECU) coupled to the first sensor, the second sensor, the memory and the GPS unit and configured to:
      determine a tired value of the driver corresponding to how tired the driver is based on the vehicle performance data and the driver condition data,
      determine that the driver is getting tired when the tired value is equal to or greater than a first tired threshold,
      determine a desired destination based on the list of preferred stops that the vehicle can reach before the tired value reaches or exceeds a second tired threshold; and
   an output device configured to output navigation instructions providing directions to the desired destination from the current location of the vehicle.

2. The system of claim 1 wherein the vehicle performance data includes at least one of vehicle speed data, acceleration data, braking data, steering data or lane departure data and wherein driver condition data corresponds to at least one of facial expressions of the driver, body positioning of the driver, eye movement of the driver or speech patterns of the driver.

3. The system of claim 1 wherein:
the vehicle performance data includes a first type of data and a second type of data;
the driver condition data includes a third type of data and a fourth type of data;
each of the first type of data, the second type of data, the third type of data and the fourth type of data is assigned a weighted value; and
the tired value is equal to a sum of the weighted value of the first type of data, the second type of data, the third type of data and the fourth type of data.

4. The system of claim 1 wherein the memory is further configured to store previously detected vehicle performance data and previously detected driver condition data and wherein the ECU is configured to learn a rate of change of the tired value based on the previously detected vehicle performance data and the previously detected driver condition data.

5. The system of claim 1 wherein the memory is further configured to store previous destinations of the vehicle, the list of preferred stops include previous destinations, previously-visited chains and previously-visited categories, and the ECU is further configured to assign a priority to each preferred stop in the list of preferred stops such that more frequent previous destinations have a higher priority than less frequent previous destinations, previously-visited chains have a higher priority than less frequent previously-visited chains and previously-visited categories have a higher priority than less frequent previously-visited categories.

6. The system of claim 5 wherein the ECU is further configured to determine the desired destination by selecting a preferred category that has the highest priority, then selecting a preferred chain within the preferred category that has the highest priority and selecting a specific location of the preferred chain that the vehicle can reach before the tired value reaches or exceeds the second tired threshold.

7. The system of claim 1 further comprising an input device configured to receive a selection of a destination, wherein the output device is further configured to output a list of at least two potential destinations that the vehicle can reach before the tired value reaches or exceeds the second tired threshold when the ECU determines that the driver is getting tired, and wherein the ECU is further configured to determine that the desired destination is the destination selected using the input device.

8. The system of claim 1 wherein the ECU is further configured to determine the desired destination based on a day of the week or a time of day.

9. The system of claim 1 wherein the system is implemented in an autonomous vehicle and wherein the ECU is further configured to control the autonomous vehicle to drive to the desired destination when the tired value of the driver reaches or exceeds the second tired threshold.

10. The system of claim 1 wherein the system is implemented in an autonomous vehicle and wherein the ECU is further configured to control the vehicle to park when the vehicle reaches the desired destination if the tired value of the driver is at or above a parking tired threshold.

11. The system of claim 1 further comprising a third sensor configured to detect road condition data or an input/output port or a network access device configured to receive the road condition data, the road condition data corresponding to at least one of weather, traffic, a speed limit or a road surface and wherein the ECU is further configured to determine a rate at which the tired value of the driver is increasing based on the road condition data.

12. The system of claim 1 further comprising a network access device or an input/output port and wherein:
the vehicle is an autonomous vehicle,
the ECU is further configured to determine that the driver is unconscious based on at least one of the vehicle performance data or the driver condition data, and
the ECU is further configured to control the vehicle to park and to control the network access device or the input/output port to transmit a signal to be received by authorities when the ECU determines that the driver is unconscious.

13. A method for directing a tired driver of a vehicle to an intermediate destination comprising:
detecting, by a first sensor, vehicle performance data;
detecting, by a second sensor, driver condition data;
determining, by an electrical control unit (ECU), a tired value of a driver corresponding to how tired the driver is based on the vehicle performance data and the driver condition data;
determining, by the ECU, that the driver is getting tired when the tired value is equal to or greater than a first tired threshold;
storing, in a memory, a list of preferred stops of the driver;
detecting, by a GPS unit, a current location of the vehicle;
determining, by the ECU, a desired destination based on the list of preferred stops that the vehicle can reach before the tired value reaches or exceeds a second tired threshold; and
outputting, by an output device, navigation instructions providing directions to the desired destination from the current location of the vehicle.

14. The method of claim 13 wherein the vehicle performance data includes at least one of vehicle speed data, acceleration data, braking data, steering data or lane departure data and wherein driver condition data corresponds to at least one of facial expressions of the driver, body positioning of the driver, eye movement of the driver or speech patterns of the driver.

15. The method of claim 13 further comprising:
storing, in the memory, previously detected vehicle performance data and previously detected driver condition data; and
determining, by the ECU, a rate of change of the tired value based on the previously detected vehicle performance data and the previously detected driver condition data.

16. The method of claim 13 further comprising:
determining, by the ECU, that the tired value is greater than the second tired threshold; and
outputting, by the output device, a warning to the driver requesting the driver to park the vehicle.

17. The method of claim 13 further comprising:
receiving, by an input device, input data indicating that the driver does not want to stop at the desired destination;
determining, by the ECU, a second desired destination in response to receiving the input data; and
outputting, by the output device, output data indicating a distance to the second desired destination.

18. The method of claim 13 further comprising:
receiving, by an input device, a request to view the tired value; and
outputting, by the output device, the tired value.

19. A method for directing a tired driver of a vehicle to an intermediate destination comprising:
detecting, by a first sensor, vehicle performance data;
detecting, by a second sensor, driver condition data;

determining, by an electrical control unit (ECU), a tired value of a driver corresponding to how tired the driver is based on the vehicle performance data and the driver condition data;

determining, by the ECU, a maximum amount of time that the vehicle can travel before the tired value of the driver reaches a tired threshold value;

storing, in a memory, a list of previous destinations of the vehicle;

detecting, by a GPS unit, a current location of the vehicle;

determining, by the ECU, a desired destination that the vehicle can reach within the maximum amount of time based on the list of previous destinations; and outputting, by an output device, navigation instructions providing directions to the desired destination from the current location of the vehicle.

20. The method of claim 19 wherein determining the desired destination includes determining a chain or a category associated with the previous destinations and determining a location corresponding to the chain or the category that the vehicle can reach within the maximum amount of time.

* * * * *